United States Patent
Yamanishi et al.

(10) Patent No.: US 10,090,718 B2
(45) Date of Patent: Oct. 2, 2018

(54) CONTACTLESS CHARGING DEVICE, PROGRAM THEREFOR, AND AUTOMOBILE HAVING CONTACTLESS CHARGING DEVICE MOUNTED THEREIN

(71) Applicant: Panasonic Intellectual Property Management Co., Ltd., Osaka (JP)

(72) Inventors: Yuto Yamanishi, Kanagawa (JP); Ken Hatakeyama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 162 days.

(21) Appl. No.: 15/102,336

(22) PCT Filed: Dec. 8, 2014

(86) PCT No.: PCT/JP2014/006111
§ 371 (c)(1),
(2) Date: Jun. 7, 2016

(87) PCT Pub. No.: WO2015/093002
PCT Pub. Date: Jun. 25, 2015

(65) Prior Publication Data
US 2017/0018950 A1    Jan. 19, 2017

(30) Foreign Application Priority Data

Dec. 16, 2013  (JP) ................................ 2013-258918

(51) Int. Cl.
*H02J 50/60*  (2016.01)
*H02J 50/00*  (2016.01)
(Continued)

(52) U.S. Cl.
CPC .............. *H02J 50/60* (2016.02); *H02J 7/025* (2013.01); *H02J 17/00* (2013.01); *H02J 50/10* (2016.02); *H02J 50/90* (2016.02)

(58) Field of Classification Search
CPC ....................................................... H02J 50/60
(Continued)

(56) References Cited

U.S. PATENT DOCUMENTS 8,179,089 B2 *  5/2012  Shiozaki ................. H02J 7/025
                                                  320/108
8,305,036 B2   11/2012  Toya et al.
(Continued)

FOREIGN PATENT DOCUMENTS

EP    2 555 378    2/2013
EP    3 032 687    6/2016
(Continued)

OTHER PUBLICATIONS

Extended European Search Report dated Sep. 26, 2016 in corresponding European Application No. 14872749.8.
(Continued)

*Primary Examiner* — Drew A Dunn
*Assistant Examiner* — Jerry D Robbins
(74) *Attorney, Agent, or Firm* — Wenderoth, Lind & Ponack, L.L.P.

(57) ABSTRACT

A contactless charging device includes a placement plate on which a portable apparatus is placed, a charging coil, a position detector having a position detection coil, a foreign object detector having a foreign object detection coil, an alarm, and a controller. The position detection coil and the foreign object detection coil are disposed on or under the placement plate. The controller drives the alarm if the foreign object detector detects the presence of a conductive foreign object on the placement plate, and then the position (Continued)

detector detects the portable apparatus on the placement plate.

4 Claims, 9 Drawing Sheets

(51) Int. Cl.
    *H02J 50/10*     (2016.01)
    *H02J 50/12*     (2016.01)
    *H02J 50/80*     (2016.01)
    *H02J 50/90*     (2016.01)
    *H02J 17/00*     (2006.01)
    *H02J 7/02*     (2016.01)

(58) Field of Classification Search
    USPC ......................................................... 320/108
    See application file for complete search history.

(56) References Cited

U.S. PATENT DOCUMENTS

| | | | | |
|---|---|---|---|---|
| 8,344,688 | B2* | 1/2013 | Yoda | H02J 7/025 |
| | | | | 320/107 |
| 8,766,487 | B2* | 7/2014 | Dibben | H02J 5/005 |
| | | | | 307/104 |
| 8,947,045 | B2* | 2/2015 | Jung | H02J 7/0029 |
| | | | | 320/108 |
| 9,145,110 | B2* | 9/2015 | Van Wiemeersch | B60R 25/1004 |
| 9,178,361 | B2* | 11/2015 | Liu | H02J 5/005 |
| 2009/0079387 | A1* | 3/2009 | Jin | H02J 7/0004 |
| | | | | 320/108 |
| 2013/0127255 | A1* | 5/2013 | Tsujimoto | H04B 5/0037 |
| | | | | 307/104 |

FOREIGN PATENT DOCUMENTS

| | | |
|---|---|---|
| JP | 2009-247194 | 10/2009 |
| JP | 2009-296780 | 12/2009 |
| JP | 2012-257404 | 12/2012 |
| JP | 2013-027074 | 2/2013 |

OTHER PUBLICATIONS

International Search Report of PCT application No. PCT/JP2014/006111 dated Jan. 27, 2015.

\* cited by examiner

CONTACTLESS CHARGING DEVICE, PROGRAM THEREFOR, AND AUTOMOBILE HAVING CONTACTLESS CHARGING DEVICE MOUNTED THEREIN

1. Field of the Invention

The present invention relates to a contactless charging device charging a portable apparatus such as a mobile phone in a contactless (noncontact) manner, a program therefor, and an automobile having the contactless charging device mounted therein.

2. Description of the Related Art

Functions of a portable apparatus such as a mobile phone have been considerably advanced, and thus power consumption thereof has also been increased. Therefore, charging the portable apparatus is required to be performed at any location including the inside of a vehicle. As a trend in recent years, contactless (noncontact) charging without using a cable but using the principle of electromagnetic induction or magnetic field resonance has attracted attention. The following contactless charging device has been proposed according to such a demand.

In other words, a mobile terminal charging device includes a main body case having a placement plate on its upper surface, a position detector detecting a position of a portable apparatus placed on the placement plate, and a charging coil disposed under the placement plate. A current flows through the charging coil which is moved to the position of the portable apparatus detected by the position detector, and thus contactless charging is performed (for example, PTL 1).

CITATION LIST

Patent Literature

PTL 1: Japanese Patent Unexamined Publication No. 2009-247194

SUMMARY OF INVENTION

The present invention provides a contactless charging device preventing an increase in the temperature of a conductive foreign object during charging even in a case where a portable apparatus is placed on the conductive foreign object.

According to a first aspect of the present disclosure, there is provided a contactless charging device having a placement plate on which a portable apparatus is placed, and having the following configurations. A position detection coil and a foreign object detection coil are disposed on or under the placement plate. A position detector having the position detection coil detects a portable apparatus present on the placement plate at a predetermined time interval. A foreign object detector having the foreign object detection coil detects a conductive foreign object present on the placement plate at a predetermined time interval. A controller drives the alarm if the foreign object detector detects the presence of a conductive foreign object, and then the position detector detects the portable apparatus.

As mentioned above, according to the contactless charging device of the present disclosure, it is possible to prevent the temperature of the conductive foreign object from increasing during charging even if the portable apparatus is placed on the conductive foreign object on the placement plate. In other words, in a state in which a conductive foreign object is present on the placement plate, and the portable apparatus is not present, it is possible to detect the conductive foreign object by using the foreign object detector. Even if a conductive foreign object is placed on the placement plate, the position detector can detect the portable apparatus which resonates with, for example, a pulse signal with 1 MHz and outputs an echo signal, so as to discriminate the portable apparatus from the foreign object.

By using such characteristics of the foreign object detector and the position detector, in a case where a conductive foreign object is placed on the placement plate, and then the portable apparatus is placed on the conductive foreign object, it is possible to notify a user of the presence of the foreign object before the temperature of the conductive foreign object increases due to starting of charging.

Therefore, the user can remove, for example, the conductive foreign object according to a warning from the alarm, and, as a result, it is possible to prevent the temperature of the conductive foreign object from increasing.

DETAILED DESCRIPTION OF THE PREFERRED EMBODIMENTS

Prior to description of an exemplary embodiment of the present invention, problems of the above-described example of the related art will be described. In the contactless charging device of the related art, a case is assumed in which a conductive foreign object such as a coin is placed on an upper surface of the placement plate in a case where charging is not performed, and charging is started in a case where a portable apparatus is further placed thereon. In this case, a magnetic flux from the charging coil is also supplied to the conductive foreign object, and thus the temperature of the conductive foreign object increases.

Particularly, in a case where a contactless charger is installed inside an automobile, the portable apparatus placed on the placement plate on the upper surface of the main body case is influenced by a changing speed or vibration of the automobile. Thus, the contactless charger has a shape, a so-called a box shape in which a part of the main body case on an outer circumference of the placement plate protrudes further upwardly than the placement plate so that the portable apparatus does not come out thereof.

If the box-shaped contactless charger is installed inside the automobile, despite a coin or the like being present on the placement plate, a user may place a portable apparatus on the placement plate in order to charge the portable apparatus without being aware of the coin. In such a case, charging is started in a state in which the coin is interposed between the charging coil and the portable apparatus, and, as a result, the temperature of the conductive foreign object increases.

Hereinafter, an exemplary embodiment of the present invention will be described with reference to the drawings.

Figure 1:
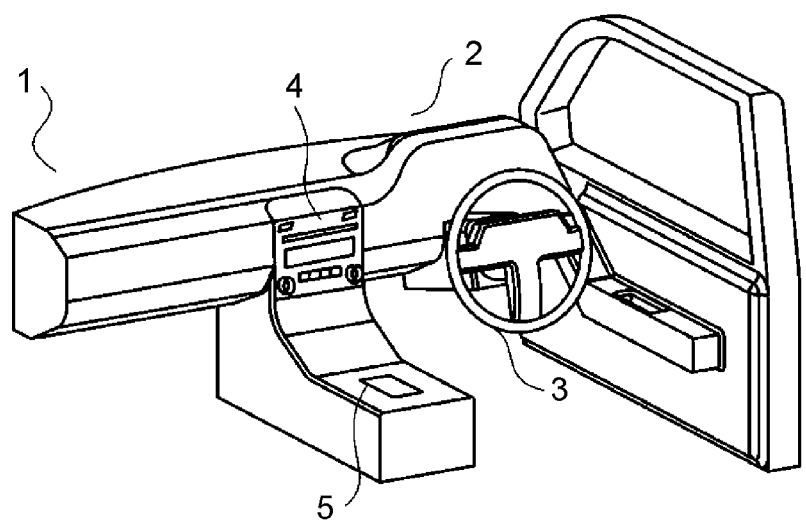
FIG. 1 is a perspective view illustrating a state in which a contactless charging device according to an exemplary embodiment of the present invention is provided inside a vehicle.

In FIG. 1, steering wheel 3 is provided on the front side in vehicle interior 2 of automobile 1. Electronic apparatus 4 which reproduces music or videos and displays car navigation images and the like is provided on the lateral side of steering wheel 3. Contactless charging device 5 is provided on the rear side of electronic apparatus 4 in vehicle interior 2.

Contactless charging device 5 includes, as illustrated in FIGS. 2 to 8, box-shaped main body case 7 in which placement plate 6 is disposed on an upper surface thereof, and charging coil 8 provided to be moved in a horizontal direction in a state of opposing a lower surface side of placement plate 6, inside main body case 7.

Contactless charging device also includes driver 9 which can cause charging coil 8 to be moved in the horizontal direction so as to oppose the lower surface side of placement plate 6, and a controller (the reference numeral 10 in FIG. 9) connected to driver 9 and charging coil 8.

Figure 6:
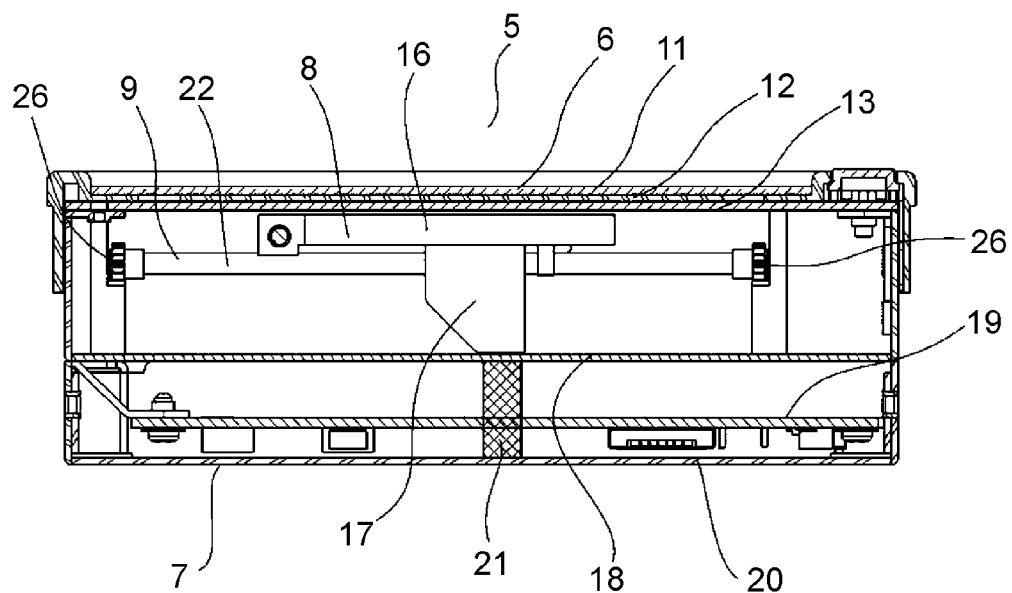
FIG. 6 is a side sectional view taken along dashed line S-S' in the contactless charging device illustrated in FIG. 2.

As illustrated in FIG. 6, placement plate 6 has a configuration in which front surface plate 11, intermediate plate 12, and rear surface plate 13 overlap each other.

Figure 10:
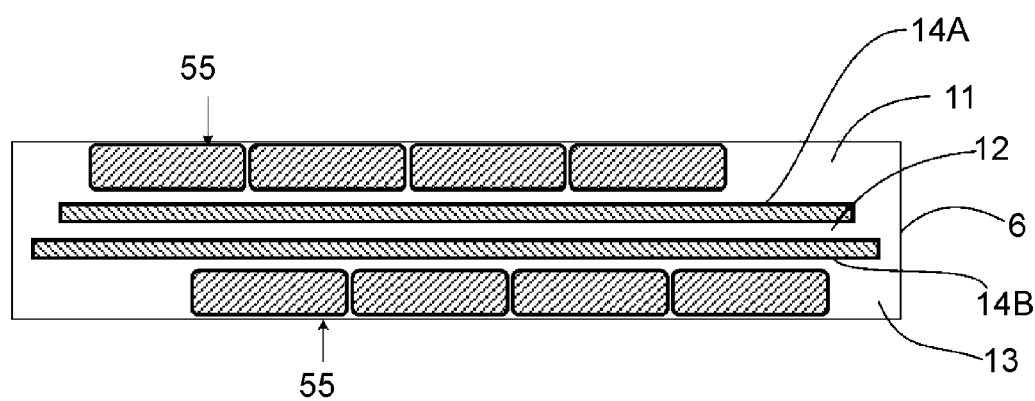
FIG. 10 is a diagram illustrating arrangement of a position detection coil and a foreign object detection coil of the contactless charging device illustrated in FIG. 2.
Figure 11:
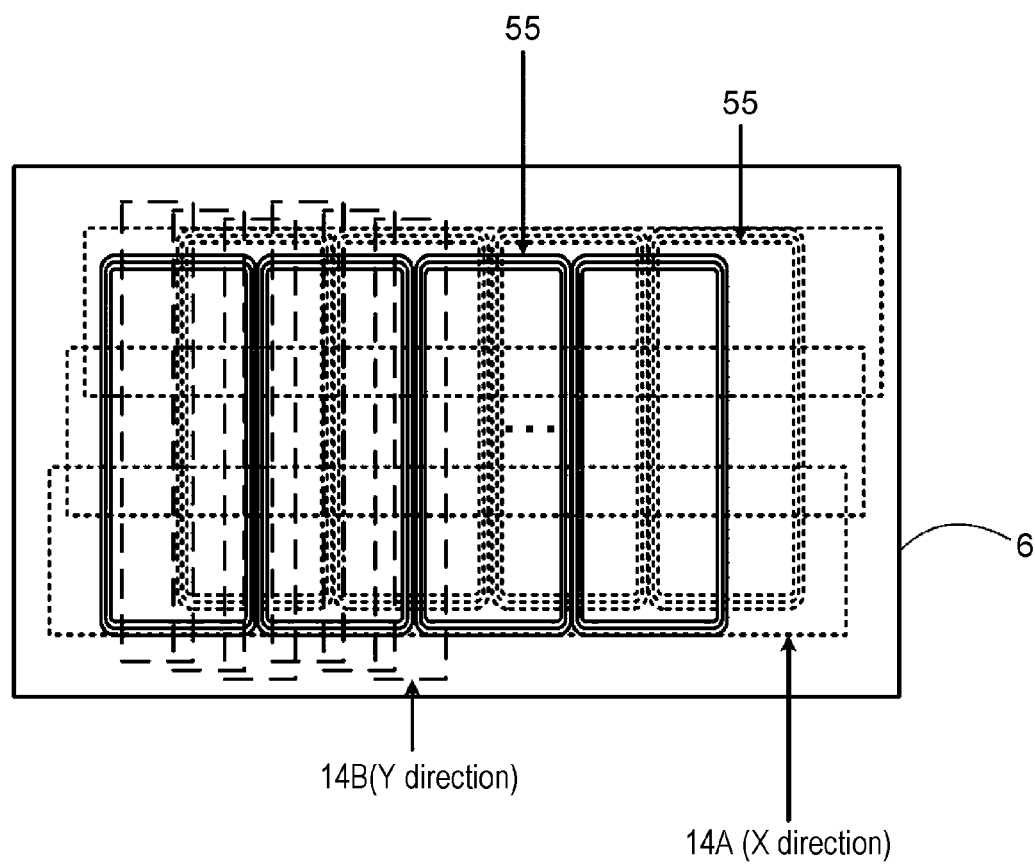
FIG. 11 is a diagram illustrating arrangement of the position detection coil and the foreign object detection coil of the contactless charging device illustrated in FIG. 2.

Front surface plate 11 and rear surface plate 13 are made of synthetic resin, and intermediate plate 12 is made of ceramics. In other words, a magnetic flux from charging coil 8 can pass through placement plate 6 toward portable apparatus 15. Position detection coils 14A and 14B illustrated in FIGS. 10 and 11 are provided in the X direction and the Y direction on front and rear surfaces of intermediate plate 12. Hereinafter, both of the coils will also be referred to as position detection coils 14.

Figure 3:
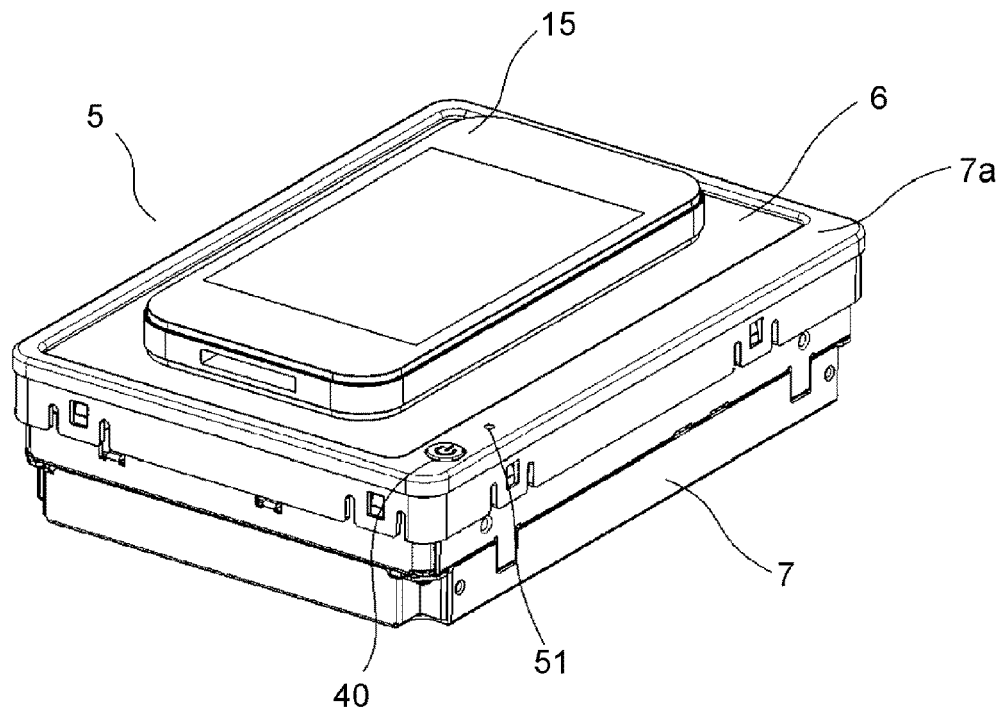
FIG. 3 is a perspective view illustrating a state in which a mobile terminal is placed on the contactless charging device illustrated in FIG. 2.

Position detection coils 14 are used in the above PTL 1 (Japanese Patent Unexamined Publication No. 2009-247194), and detect at which position portable apparatus 15 is placed on the upper surface of placement plate 6 as illustrated in FIG. 3.

Position detection coils 14 will further be described. Position detection coils 14 are provided in intermediate plate 12 made of ceramics, forming placement plate 6. Specifically, as illustrated in FIGS. 10 and 11, position detection coil 14A detecting a position in the X axis direction is provided on the front surface side of intermediate plate 12, and position detection coil 14B detecting a position in the Y axis direction is provided on the rear surface side of intermediate plate 12.

Position detection coil 14A and position detection coil 14B are in a state of being orthogonal to each other via intermediate plate 12 made of ceramics forming placement plate 6.

Four foreign object detection coils 55 are disposed in a state of being close to each other in the Y direction on a front surface side (upper surface side) of front surface plate 11. Four foreign object detection coils 55 are disposed in a state of being close to each other in the Y direction on a rear surface side (lower surface side) of rear surface plate 13.

In the present exemplary embodiment, foreign object detection coils 55 detect whether or not there is a foreign object on the front surface (upper surface side) of front surface plate 11 during non-conduction of charging coil 8. This will be described in detail in the following description of an operation thereof.

Figure 4:
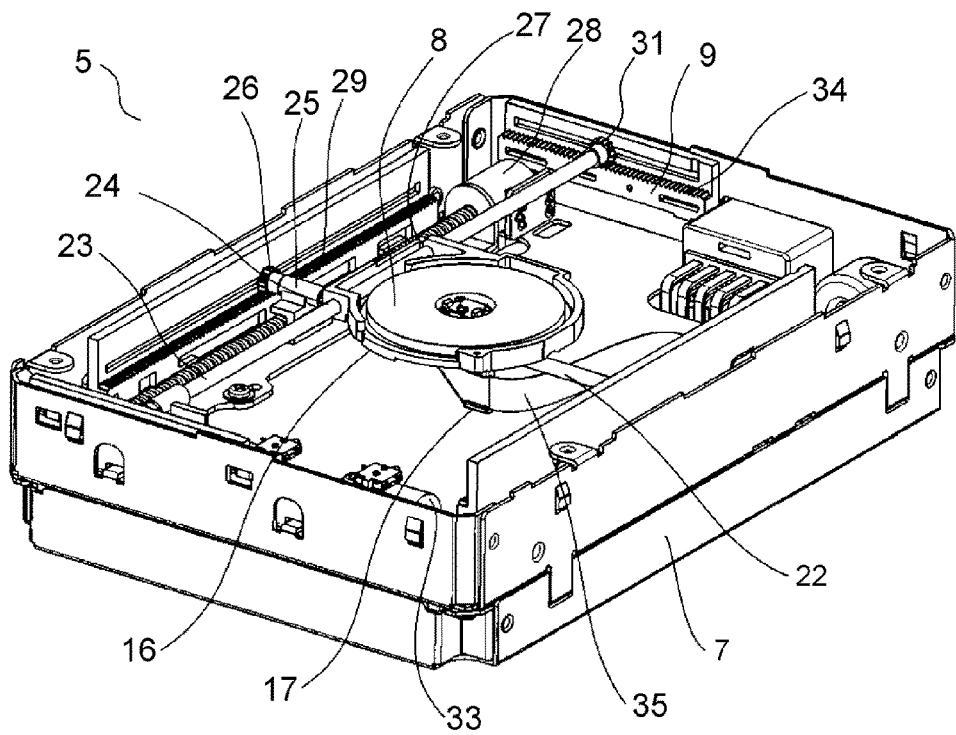
FIG. 4 is a perspective view illustrating a state in which a part of the contactless charging device illustrated in FIG. 2 is omitted.
Figure 5:
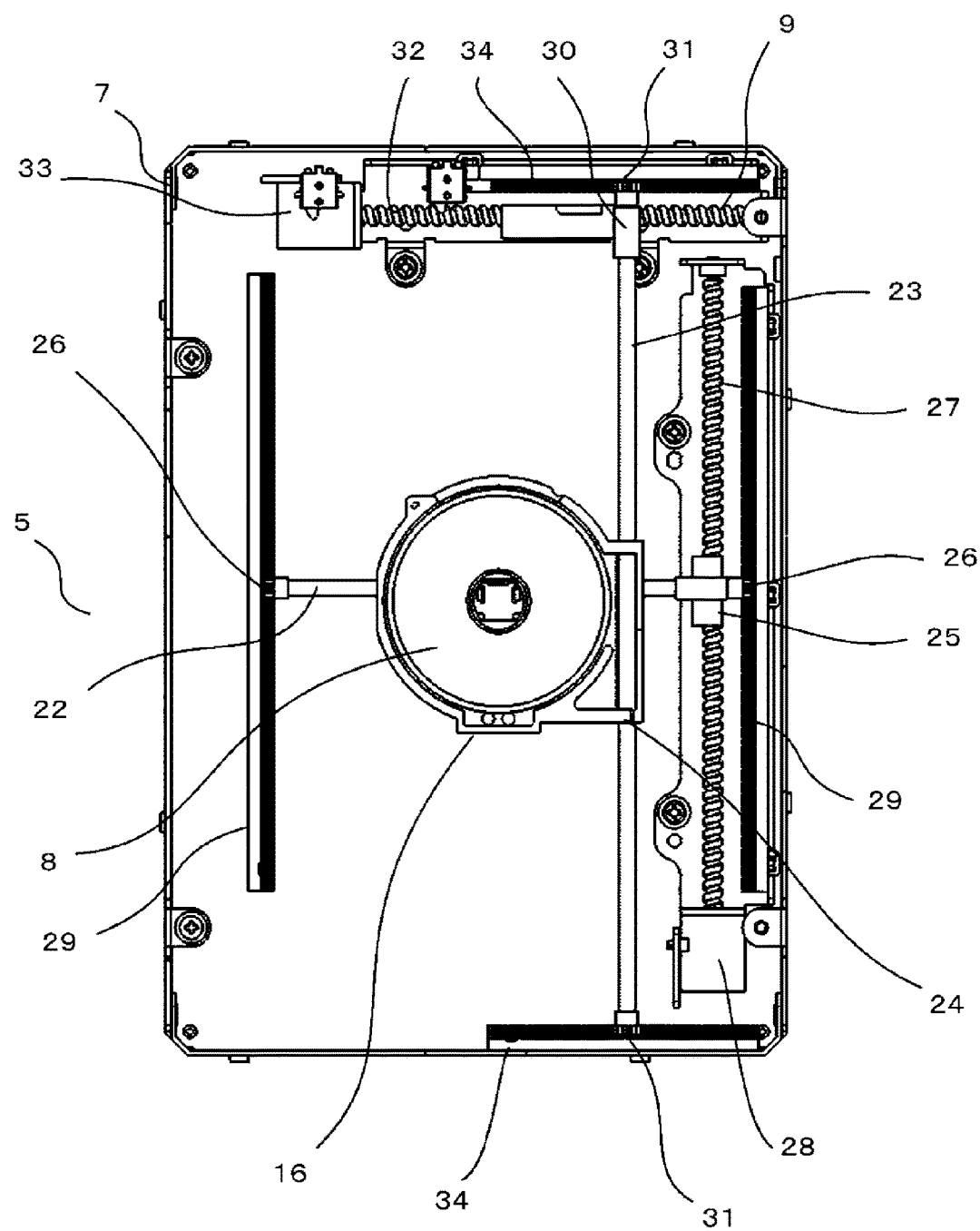
FIG. 5 is a plan view illustrating the contactless charging device in the state illustrated in FIG. 4.

Next, charging coil 8 will be described. As illustrated in FIGS. 4 and 5, charging coil 8 has a ring shape formed by winding a wiring material in a spiral shape. An outer circumferential side and a lower surface side of charging coil 8 are held by holding member 16 made of synthetic resin.

Support leg 17 extending toward a lower side of charging coil 8 is integrally formed with holding member 16 on its lower surface by using synthetic resin as illustrated in FIG. 6.

A gap of 0.3 millimeters is provided between a lower surface of support leg 17 and an upper surface of conductive support plate 18 disposed under support leg 17. Therefore, in a normal state, the lower surface of support leg 17 is not in contact with the upper surface of support plate 18 during movement of charging coil 8.

Control board 19 and lower plate 20 of main body case 7 are disposed under support plate 18. Support member 21 penetrating through control board 19 is provided between a lower surface of support plate 18 and an upper surface of lower plate 20.

In other words, in the present exemplary embodiment, the lower surface side of support plate 18 is supported by lower plate 20 of main body case 7 via support member 21 in order to increase the strength relative to excessive weight.

Next, driver 9 will be described. Driver 9 moves charging coil 8 to a position opposing a terminal charging coil (not illustrated) of portable apparatus 15.

As illustrated in FIGS. 4 and 5, driver 9 includes X-axis direction driving shaft 22 and Y-axis direction driving shaft 23. An intermediate portion of each of X-axis direction driving shaft 22 and Y-axis direction driving shaft 23 is in contact with locations which are different from a portion of holding member 16 holding charging coil 8.

In other words, a penetration hole (not illustrated) through which X-axis direction driving shaft 22 penetrates and penetration hole 24 through which Y-axis direction driving shaft 23 penetrates are provided in holding member 16 with a predetermined gap in the vertical direction in a state of crossing each other. X-axis direction driving shaft 22 and Y-axis direction driving shaft 23 are in contact with penetration hole 24.

Worm wheel 25 is provided at one end side of X-axis direction driving shaft 22, gear 26 is provided at one end side thereof, and gear 26 is also provided at the other end side thereof.

Worm wheel 25 is engaged with worm 27, and worm 27 is connected to motor 28. Gears 26 on both sides are respectively engaged with gear plates 29. Therefore, if motor 28 is driven, worm 27 is rotated, and thus worm wheel 25 is moved in the X axis direction along with X-axis direction driving shaft 22. Charging coil 8 integrated with X-axis direction driving shaft 22 is moved in the X axis direction.

Worm wheel 30 is provided at one end side of Y-axis direction driving shaft 23, gear 31 is provided at one end side thereof, and gear 31 is also provided at the other end side thereof. Worm wheel 30 is engaged with worm 32, and worm 32 is connected to motor 33. Gears 31 on both sides are respectively engaged with gear plates 34. Therefore, if motor 33 is driven, worm 32 is rotated, and thus worm wheel 30 is moved in the Y axis direction along with Y-axis direction driving shaft 23. Charging coil 8 integrated with Y-axis direction driving shaft 23 is moved in the Y axis direction.

Flexible wiring 35 illustrated in FIG. 4 causes a current to flow through charging coil 8. An end of flexible wiring 35 is fixed to the side surface of above-described support leg 17.

Figure 9:
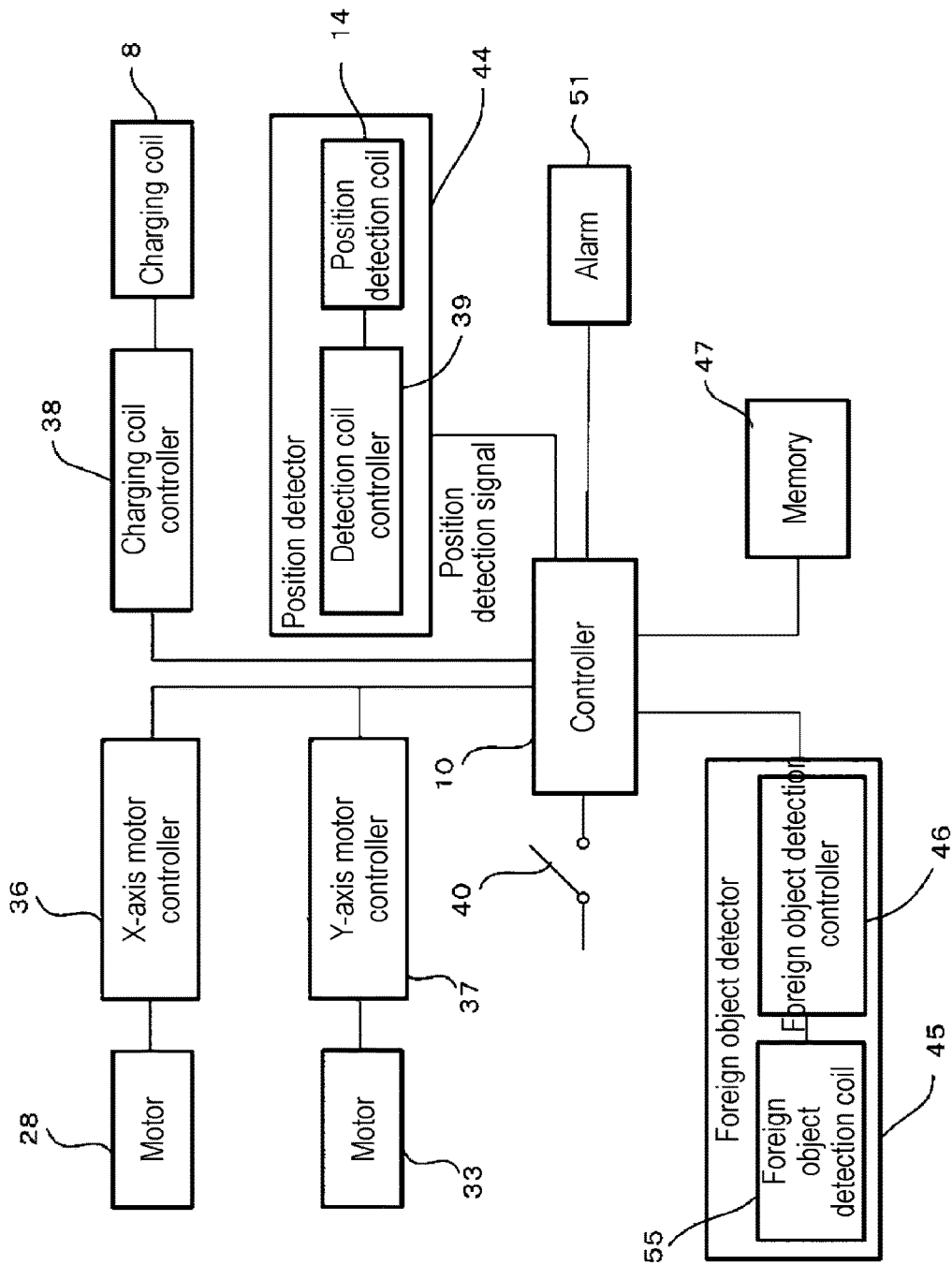
FIG. 9 is a control block diagram of the contactless charging device illustrated in FIG. 2.

As illustrated in FIG. 9, controller 10 is connected to motor 28 via X-axis motor controller 36, and is connected to motor 33 via Y-axis motor controller 37.

Controller 10 is connected to charging coil 8 via charging coil controller 38. Controller 10 is also connected to position detector 44 and foreign object detector 45.

Figure 2:
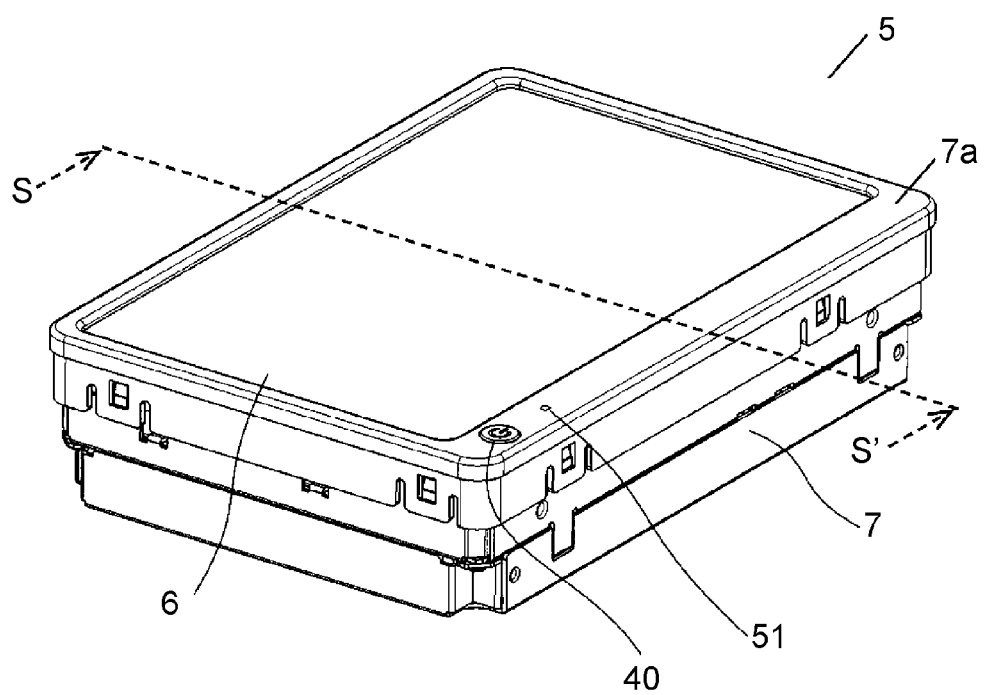
FIG. 2 is a perspective view illustrating the contactless charging device according to the exemplary embodiment of the present invention.

Position detector 44 includes detection coil controller 39 and position detection coils 14. Foreign object detector 45 includes foreign object detection controller 46 and foreign object detection coils 55. Memory 47 stores a program or the like for detecting a conductive foreign object by using foreign object detection coils 55 so as to perform a safety operation. Alarm 51 is connected to controller 10 as illustrated in FIG. 9, and is mounted in main body case 7 as illustrated in FIGS. 2 and 3.

An operation will further be described in detail on the basis of the above-described configuration. If power switch 40 illustrated in FIGS. 2 and 9 is turned on (step S1 in FIG. 12), a position of charging coil 8 is initialized (step S2 in FIG. 12).

Figure 7:
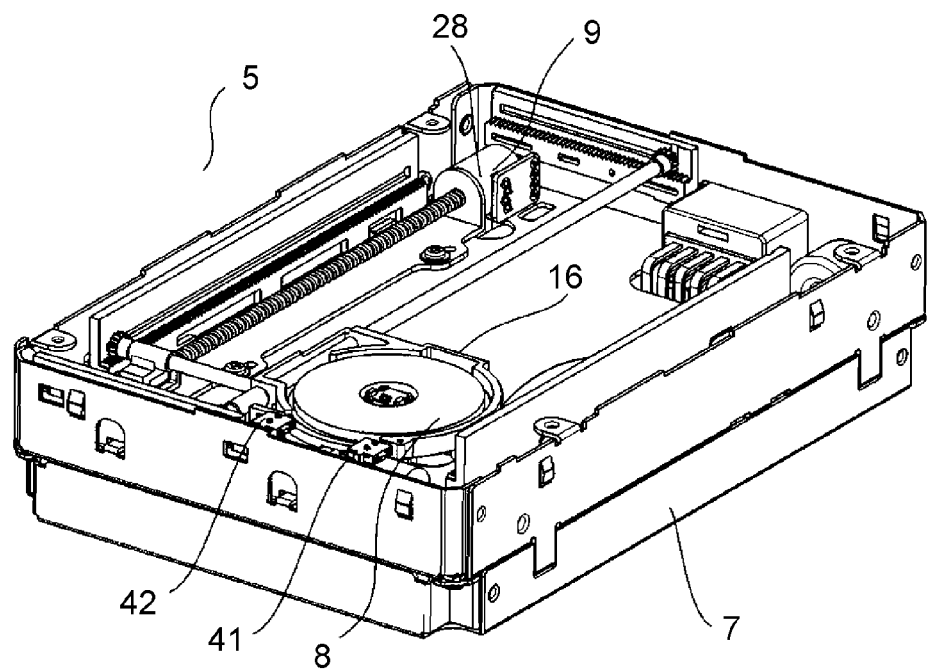
FIG. 7 is a perspective view illustrating another state of the contactless charging device illustrated in FIG. 4.
Figure 8:
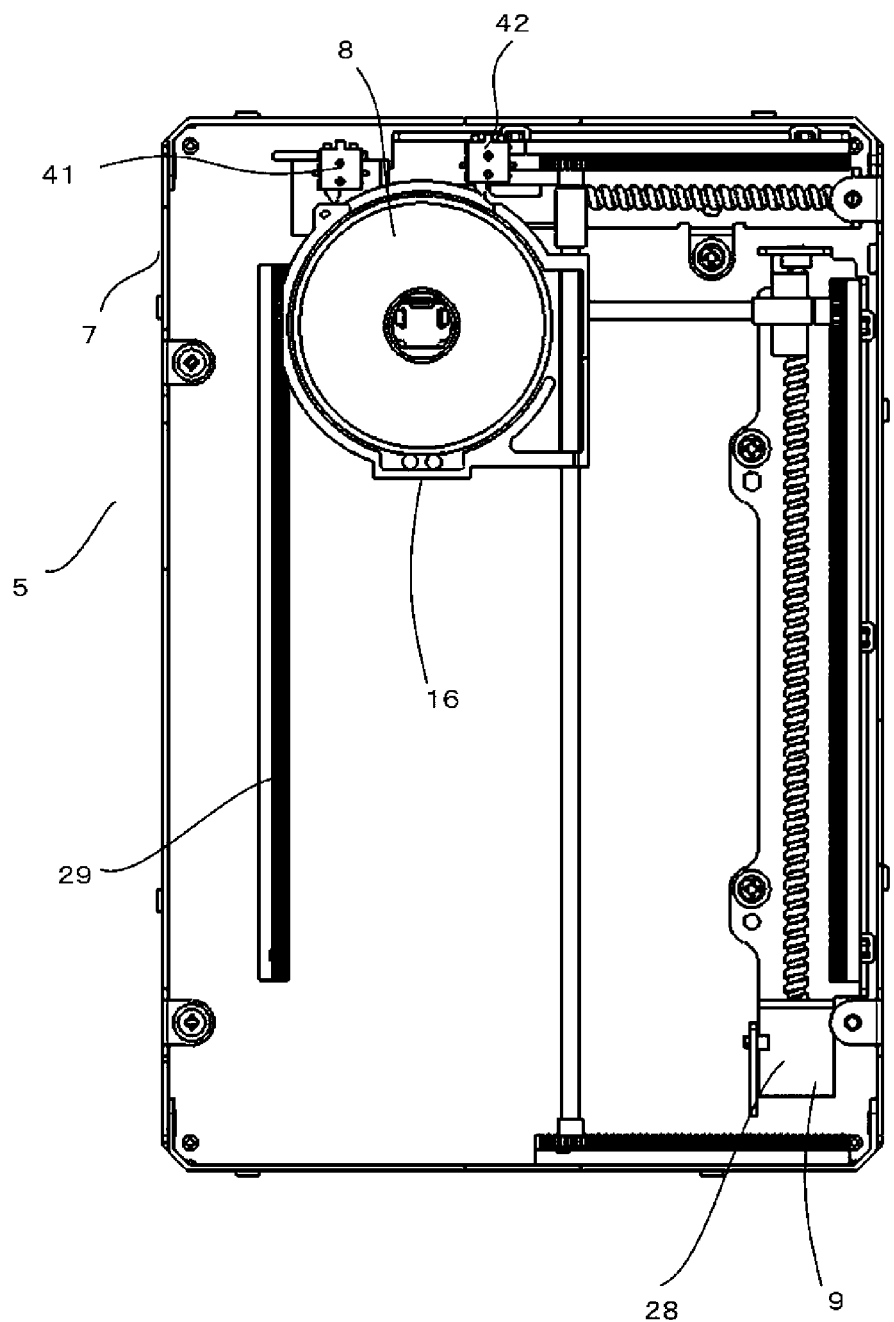
FIG. 8 is a plan view illustrating the contactless charging device in the state illustrated in FIG. 7.

The position initialization indicates that controller 10 chives motors 28 and 33 via X-axis motor controller 36 and Y-axis motor controller 37 so as to return charging coil 8 to the corner (coordinates xo and yo) illustrated in FIG. 7.

In other words, if charging coil 8 is moved to the corner inside main body case 7 provided with switches 41 and 42, switches 41 and 42 are operated, and thus controller 10 determines that a position of charging coil 8 has been initialized.

Figure 12:
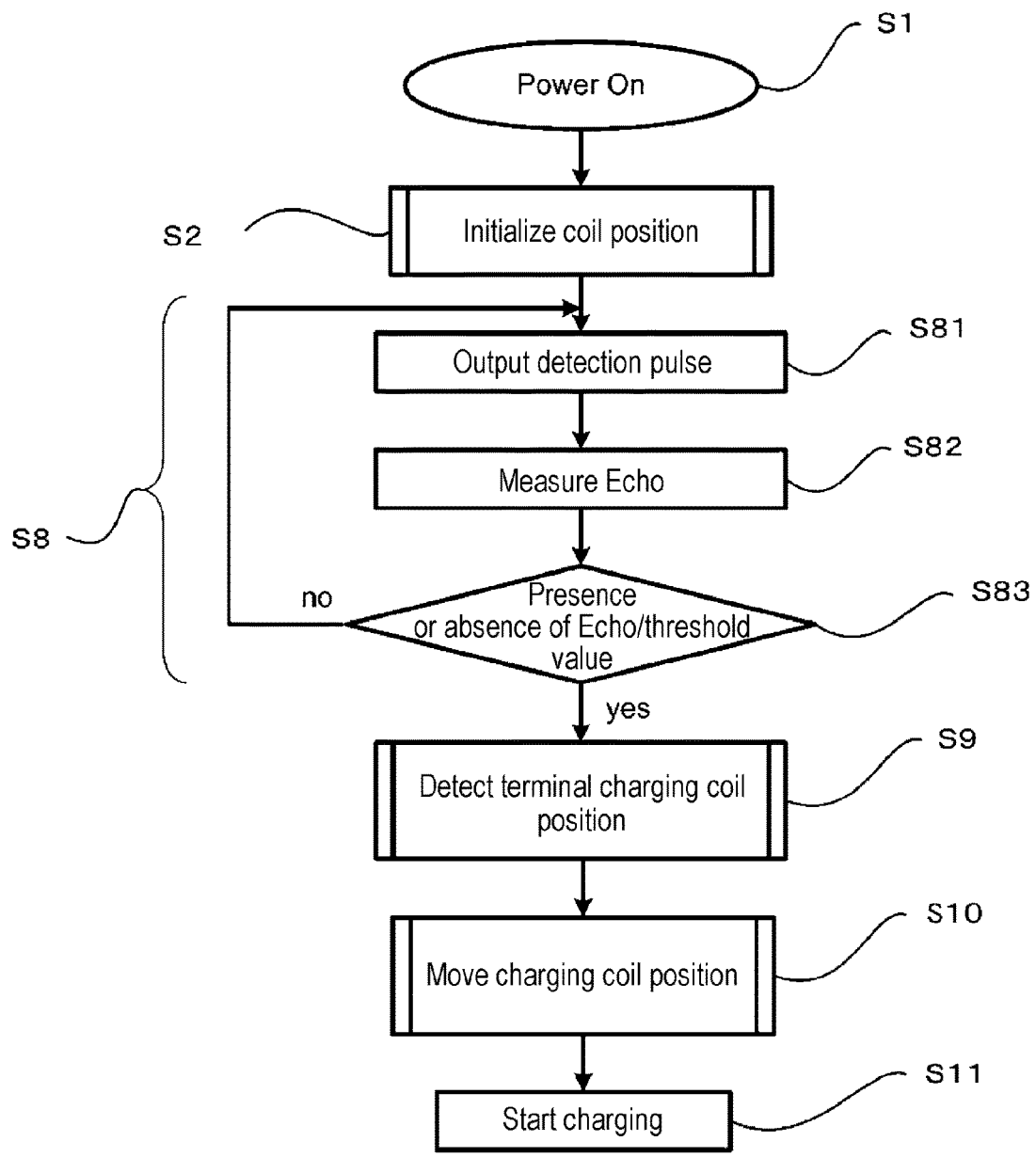
FIG. 12 is a flowchart illustrating an operation of the contactless charging device illustrated in FIG. 2.

Next, controller 10 detects at which position portable apparatus 15 is present on the upper surface of placement plate 6 as illustrated in FIG. 3, by using position detection coils 14 (step S8 in FIG. 12).

A location where portable apparatus 15 is placed is actually a location of the terminal charging coil (not illustrated) built into portable apparatus 15.

This will be described. In a case where it is detected at which position portable apparatus 15 is present as illustrated in FIG. 3 on the upper surface of placement plate 6, detection coil controller 39 in FIG. 9 sequentially supplies a pulse signal with 1 MHz to position detection coils 14 (step S81 in FIG. 12).

At this time, controller 10 determines at which position portable apparatus 15 is present as illustrated in FIG. 3 on the upper surface of placement plate 6 on the basis of the presence or absence of an echo signal from the terminal charging coil (not illustrated) of portable apparatus 15 (steps S82 and S83 in FIG. 12).

The echo signals captured in position detection coils 14 at this time are temporarily stored in memory 47 illustrated in FIG. 9.

Meanwhile, as is well known, the terminal charging coil (not illustrated) of portable apparatus 15 resonates at 1 MHz before charging is performed. Therefore, when a pulse signal with 1 MHz is sequentially output from above-described position detection coils 14, a large echo signal is emitted from the terminal charging coil, and is captured by position detection coil 14.

Consequently, controller 10 detects at which position portable apparatus 15 is present as illustrated in FIG. 3 on the upper surface of placement plate 6.

If it is determined that portable apparatus 15 is placed on the upper surface of placement plate 6 as mentioned above, subsequently, controller 10 operates detection coil controller 39 so as to sequentially supply pulse signals with 1 MHz to position detection coil 14A and position detection coil 14B, thereby specifying a position of the terminal charging coil (not illustrated) of portable apparatus 15 (step S9 in FIG. 12).

Next, controller 10 drives motors 28 and 33 via X-axis motor controller 36 and Y-axis motor controller 37, so as to move charging coil 8 to the detected position of the terminal charging coil of portable apparatus 15 (step S10 in FIG. 12), and then starts charging via charging coil controller 38 (step S11 in FIG. 12).

Figure 14:
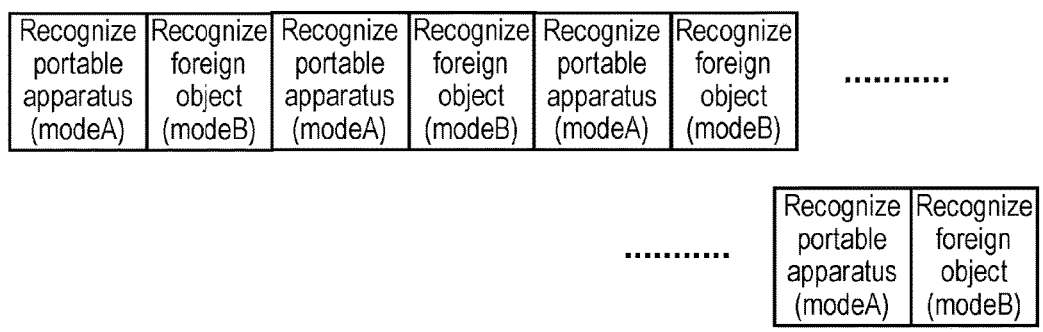
FIG. 14 is a diagram illustrating an operation state of the contactless charging device illustrated in FIG. 2.

Next, a major characteristic point in the present exemplary embodiment will be described. The major characteristic point in the present exemplary embodiment is a configuration in which, as illustrated in FIG. 14, controller 10 alternately drives position detector 44 (including both of position detection coils 14A and 14B) and foreign object detector 45 at a predetermined time interval, and drives alarm 51 in a case where a detection level detected by foreign object detector 45 is higher than a threshold value. Hereinafter, this will be described in detail.

As illustrated in FIGS. 2 and 3, main body case 7 portion on the outer circumference of placement plate 6 is provided with upward protrusion 7a protruding further upwardly the placement plate 6, and alarm 51 and power switch 40 are provided in upward protrusion 7a of main body case 7.

In other words, upward protrusion 7a prevents portable apparatus 15 from falling out of main body case 7 during charging of portable apparatus 15 due to portable apparatus 15 receiving vibration or an inertial force according to traveling.

However, if upward protrusion 7a is provided at main body case 7 portion on the outer circumference of placement plate 6 as mentioned above, a recess is present on the upper surface of main body case 7. However, a driver or a fellow passenger carelessly places a conductive foreign object such as a coin on the recess, that is, the upper surface of placement plate 6.

If charging is started in a state in which portable apparatus 15 is placed on the conductive foreign object, the temperature of the conductive foreign object increases due to a magnetic flux supplied from charging coil 8.

Therefore, in the present embodiment, as illustrated in FIG. 14, controller 10 performs the following operation right after power switch 40 is turned on, or before a determination operation (step S8 in FIG. 12) of determining at which position portable apparatus 15 is placed on the upper surface of placement plate 6.

Controller 10 alternately drives position detector 44 (including both of position detection coils 14A and 14B) and foreign object detector 45. In other words, controller 10 alternately drives a mode A (modeA) for driving position detector 44 and a mode B (modeB) for driving foreign object detector 45.

In a case where a detection level detected by foreign object detector 45 is higher than a threshold value (modeB operation), controller 10 holds a foreign object warning flag set to an ON state in memory 47. Thereafter, controller 10 determines that portable apparatus 15 is placed on the upper surface of placement plate 6 as illustrated in FIG. 3 (steps S82 and S83 in FIG. 12), and then checks the foreign object warning flag held in memory 47.

Figure 13:
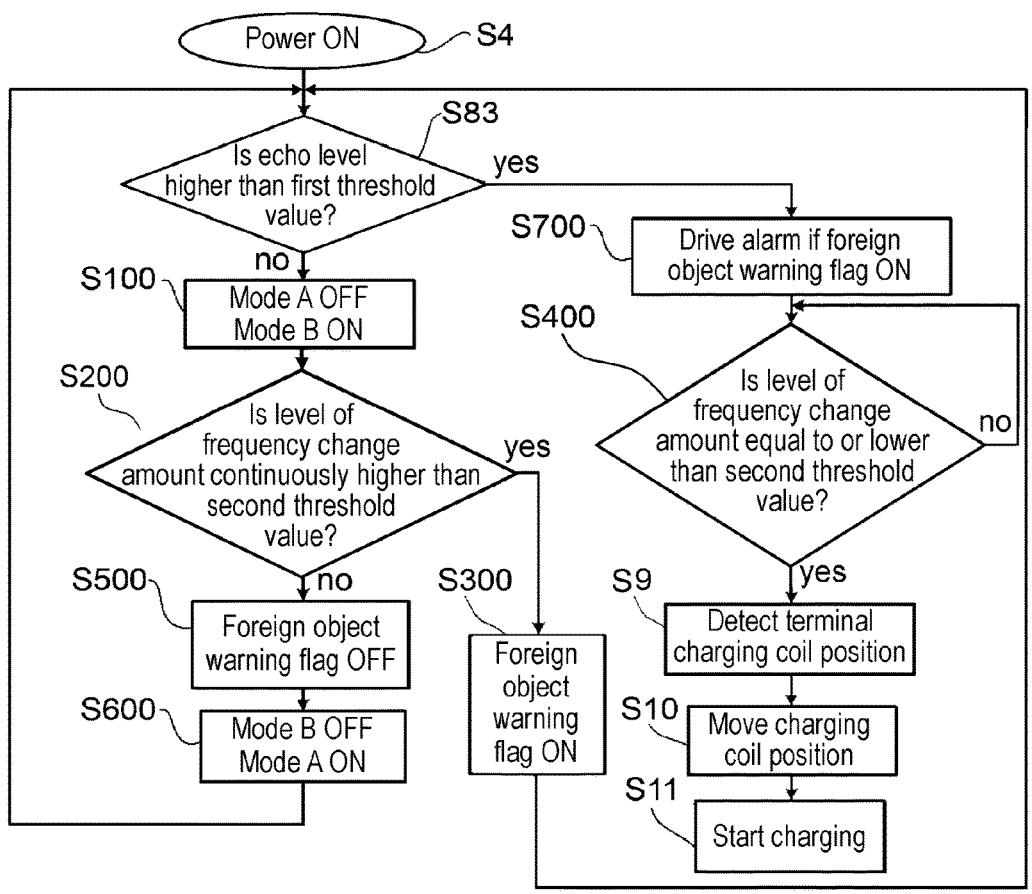
FIG. 13 is a flowchart illustrating an operation of the contactless charging device illustrated in FIG. 2.

If the foreign object warning flag ON is recognized, controller 10 drives alarm 51 (causes a red light source to blink or a warning sound to be generated) (step S700 in FIG. 13).

Thus, a user can remove, for example, a coin (an example of a conductive foreign object) according to a warning from alarm 51, and thus it is possible to prevent the temperature of the coin from increasing.

In this case, the entire upper surface of placement plate 6 is scanned with modeA for driving position detector 44 and modeB for driving foreign object detector 45 at several ms. Therefore, position detector 44 detects the presence of portable apparatus 15 at substantially the same time as foreign object detector 45 wrongly detecting portable apparatus 15 as a conductive foreign object.

Thus, a case where a driver or a fellow passenger (user) places a conductive foreign object such as a coin in the recess of the upper surface of main body case 7 and starts charging in a state in which portable apparatus 15 is placed on the conductive foreign object, and a case where foreign object detector 45 wrongly detects portable apparatus 15 as a conductive foreign object can be discriminated from each other by taking into consideration a time difference between the time when foreign object detector 45 detects the conductive foreign object and position detector 44 detects the presence of portable apparatus 15.

This will be described in more detail with reference to FIG. 13. Controller 10 detects at which position portable apparatus 15 is present as illustrated in FIG. 3 on the upper surface of placement plate 6 by using position detection coils 14 (step S83). This process is the same as in steps S82 and S83 in FIG. 12.

In other words, if a user turns on power switch 40, controller 10 supplies signals with 1 MHz to position detection coils 14 via detection coil controller 39 at a predetermined interval, and continuously detects an echo signal (steps S81 and S82 in FIG. 12).

At this time, controller 10 temporarily holds an echo signal captured by position detection coils 14 and an acquisition time (time point) in memory 47 illustrated in FIG. 9.

If a level of the echo signal is higher than a first threshold value, controller 10 determines that portable apparatus 15 is placed as illustrated in FIG. 3 at any position on the upper surface of placement plate 6 (Yes in step S83 in FIG. 13).

Next, the flow proceeds to step S700, in which controller 10 drives alarm 51 (causes a red light source to blink or a warning sound to be generated) if the foreign object warning flag held in memory 47 is set to an ON state.

In this case, if a time difference between the time at which the foreign object warning flag ON is held in memory 47 and the acquisition time of the echo signal is equal to or more than a predetermined time (for example, 0.5 seconds to 1 second), controller 10 determines that foreign object detector 45 does not wrongly detect portable apparatus 15 as a conductive foreign object. In this case, the flow progresses in a state in which the foreign object warning flag is set to an ON state.

On the other hand, if the time difference between the time at which the foreign object warning flag ON is held in memory 47 and the acquisition time of the echo signal is less than the predetermined time (for example, 0.5 seconds to 1 second), controller 10 determines that foreign object detector 45 wrongly detects portable apparatus 15 as a conductive foreign object. In this case, the flow progresses in a state in which the foreign object warning flag is set to an OFF state.

Thereafter, controller 10 drives modeB of foreign object detector 45 in order to check whether or not the user has removed the coin (step S400).

Successively, controller 10 operates detection coil controller 39 so as to sequentially supply pulse signals with 1 MHz to position detection coil 14A and position detection coil 14B, thereby specifying a position of the terminal charging coil (not illustrated) of portable apparatus 15 (step S9 in FIGS. 12 and 13).

Controller 10 specifies a position of the terminal charging coil (not illustrated) of portable apparatus 15. Next, controller 10 drives motors 28 and 33 via X-axis motor controller 36 and Y-axis motor controller 37, so as to move charging coil 8 to the detected position of the terminal charging coil of portable apparatus 15 (step S10 in FIGS. 12 and 13). Thereafter, the controller starts charging via charging coil controller 38 (step S11 in FIGS. 12 and 13).

In a case where portable apparatus 15 is not placed at any position on the upper surface of placement plate 6, an echo signal cannot be captured by position detection coils 14, and thus the flow returns to step S81 from step S83 in FIG. 12.

Successively, controller 10 supplies signals with 1 MHz to position detection coils 14 via detection coil controller 39 at a predetermined interval, and detects an echo signal in FIG. 14 (steps S81 and S82 in FIG. 12).

In other words, the above-described operations are repeatedly performed during modeA in which it is determined at which position portable apparatus 15 is present as illustrated in FIG. 3 on the upper surface of placement plate 6.

In contrast, during modeB in which it is determined whether or not a conductive foreign object is placed on the upper surface of placement plate 6, controller 10 stops the supply of the signals with 1 MHz which are being supplied to position detection coils 14 via detection coil controller 39.

Next, controller 10 supplies, for example, a signal with 10 KHz to 100 KHz to foreign object detection coils 55 at a predetermined interval via foreign object detection controller 46 in a foreign object checking mode (step S100 in FIG. 13).

Such a technique of detecting a conductive foreign object by supplying a signal with about 10 KHz to 100 KHz to the coil is a well-known technique used to probe a metal body buried in the ground. Therefore, the technique will be described briefly for avoiding complexity of description.

According to the technique, if foreign object detection coils 55 supply a signal with 10 KHz to 100 KHz, in a case where a metal (coin) is present in the vicinity thereof, the frequency changes, and thus the presence of the metal (coin) can be detected.

A level of the frequency change detected at this time is stored in memory 47. In other words, in a case where a detected level of the frequency change amount is higher than a threshold value in the foreign object checking mode, controller 10 checks the presence of a foreign object again in the foreign object checking period (modes) illustrated in FIG. 14. In a case where a level of a detected frequency change is continuously higher than the threshold value multiple times, controller 10 sets the foreign object warning flag to an ON state (steps S200 and S300 in FIG. 13).

On the other hand, in a case where the condition in which a level of a detected frequency change is continuously higher than the threshold value multiple times is not satisfied, controller 10 sets the foreign object warning flag to an OFF state (steps S200 and S500 in FIG. 13). Successively, controller 10 changes an operation thereof from modeB to modeA for determining at which position portable apparatus 15 is present as illustrated in FIG. 3 on the upper surface of placement plate 6 (step S600).

As mentioned above, the present exemplary embodiment relates to contactless charging device 5 including placement plate 6 on which portable apparatus 15 is placed, and has the following configuration.

Position detection coils 14 and foreign object detection coils 55 are disposed on or under placement plate 6. Position detector 44 having position detection coils 14 detects portable apparatus 15 present on placement plate 6 at a predetermined time interval. Foreign object detector 45 having foreign object detection coils 55 detects a conductive foreign object present on placement plate 6 at a predetermined time interval.

Controller 10 drives alarm 51 issuing a warning to the user on the basis of detection results from position detector 44 and foreign object detector 45. If foreign object detector 45 detects the presence of a conductive foreign object and then position detector 44 detects portable apparatus 15, controller 10 is configured to drive alarm 51, and thus it is possible to prevent the temperature of the conductive foreign object from increasing during charging even if portable apparatus 15 is placed on the conductive foreign object.

In other words, in a state in which a conductive foreign object is present on placement plate 6, and portable apparatus 15 is not present, it is possible to detect the conductive foreign object by using foreign object detector 45. Even if a conductive foreign object is placed on placement plate 6, position detector 44 can detect portable apparatus 15 which resonates with, for example, a pulse signal with 1 MHz and outputs an echo signal, in a discriminable manner.

By using such characteristics of foreign object detector 45 and position detector 44, in a case where a conductive foreign object is placed on placement plate 6, and then portable apparatus 15 is placed on the conductive foreign object, it is possible to notify a user of the presence of the foreign object before the temperature of the conductive foreign object increases due to starting of charging.

Therefore, the user can remove, for example, the conductive foreign object according to a warning from alarm 51, and, as a result, it is possible to prevent the temperature of the conductive foreign object from increasing.

If foreign object detector 45 is formed of a metal detection antenna coil (foreign object detection coils 55) and an oscillation circuit connected thereto, this may not be preferable in terms of versatility.

In other words, if there is a conductive foreign object, foreign object detector 45 detects the foreign object by using a change in an oscillation state of the oscillation circuit. However, the oscillation circuit is extremely delicately set, and is thus useful for charging portable apparatus 15 whose characteristics are known in advance. However, in a case where portable apparatus 15 whose characteristics are not known is charged, an oscillation state is changed by portable apparatus 15. As a result, portable apparatus 15 is wrongly detected as a conductive foreign object, and thus this configuration is not preferable in terms of versatility.

For example, in a case where contactless charging device 5 is provided in a vehicle interior of an automobile, an unspecified large number of people frequently try to charge various types of portable apparatuses 15. In this state, portable apparatus 15 cannot be charged depending on models thereof, and thus the contactless charging device is inconvenient.

Therefore, controller 10 is configured to drive alarm 51 if foreign object detector 45 detects the presence of a conductive foreign object, and position detector 44 detects portable apparatus 15 after a predefined time period elapses, and thus a user can remove, for example, the conductive foreign object according to a warning from alarm 51, and, as a result, it is possible to prevent the temperature of the conductive foreign object from increasing.

In other words, when foreign object detector 45 detects portable apparatus 15 as a conductive foreign object, position detector 44 nearly simultaneously detects the presence of portable apparatus 15. Therefore, the fact that foreign object detector 45 detects the presence of a conductive foreign object, and position detector 44 detects portable apparatus 15 after a predefined time period elapses indicates that foreign object detector 45 detects a conductive foreign object which is different from portable apparatus 15.

Therefore, even in a case where portable apparatus 15 whose characteristics are not known in advance is charged, it is possible to prevent portable apparatus 15 from being wrongly detected as a conductive foreign object. As a result, it is possible to charge various portable apparatuses 15, and the contactless charging device is convenient to use.

In the exemplary embodiment, charging coil 8 (movable charging coil) is configured to be moved to a position opposing the terminal charging coil (not illustrated) of portable apparatus 15 by driver 9 on the lower surface side of placement plate 6, but there may be a configuration in which a plurality of charging coils 8 are provided, and a current is made to flow through charging coil 8 at the position opposing the charging coil (not illustrated) of portable apparatus 15.

In the exemplary embodiment, position detection coils 14 are used as position detector 44 detecting at which position portable apparatus 15 is present as illustrated in FIG. 3 on the upper surface of placement plate 6 and may also be used as foreign object detector 45 detecting that a foreign object is present (placed) on the upper surface of placement plate 6.

As described above, in the present invention, there is a configuration in which the controller alternately drives the position detector and the foreign object detector, and drives the alarm in a case where a detection level detected by the foreign object detector is higher than a threshold value.

Thus, a user can remove, for example, a foreign object according to a warning from the alarm, and, as a result, it is possible to prevent the temperature of the foreign object from increasing.

Therefore, the contactless charging device is expected as an on-vehicle charging device or a household charging device.

The invention claimed is:
1. A contactless charging device comprising:
a placement plate on which a portable apparatus is placed;
a charging coil that is disposed to oppose a rear surface side of the placement plate;

a position detector configured to include a position detection coil disposed on or under the placement plate, and detects the portable apparatus present on the placement plate;

a foreign object detector configured to include a foreign object detection coil disposed on or under the placement plate, and detect a conductive foreign object present on the placement plate;

an alarm configured to issue a warning to a user;

a controller configured to control the position detector, the foreign object detector, and the alarm; and a memory configured to store data, wherein the controller alternately drives the position detector and the foreign object detector, when a detection level frequency detected by the foreign object detector is higher than a second threshold value, the controller turns a foreign object warning flag ON and holds a time point at which the foreign object warning flag is turned ON in the memory, when an echo signal frequency captured by the position detector is higher than a first threshold value, the controller holds a time point at which the echo signal frequency is higher than the first threshold value in the memory, and when a time difference between the time point at which the foreign object warning flag is turned ON and the time point at which the echo signal frequency is higher than the first threshold value is equal to or more than a predetermined time, the controller controls the alarm to issue the warning.

2. The contactless charging device of claim 1, further comprising:

a charging coil controller that drives the charging coil, wherein, if the foreign object detector does not detect the presence of the conductive foreign object, and the position detector detects the portable apparatus, the controller drives the charging coil via the charging coil controller, so as to start charging.

3. The contactless charging device of claim 1, wherein each of the position detection coil and the foreign object detection coil is formed of a plurality of detection coils disposed on or under the placement plate.

4. A non-transitory computer-readable recording medium storing a program for driving the controller of the contactless charging device of claim 1, the program when executed by the controller drives the controller to performs steps comprising:

a first step of detecting the presence of the portable apparatus on the placement plate based on the detection level frequency detected by the foreign object detector;

a second step of detecting the conductive foreign object present on the placement plate based on the echo signal frequency captured by the position detector; and a third step of issuing the warning to the user, wherein the first step and the second step are alternatively executed, when the detection level frequency detected in the second step is higher than the second threshold value, the time point at which the foreign object warning flag is turned ON is held in the memory, when the echo signal frequency captured in the first step is higher than the first threshold value, the time point at which the echo signal frequency is higher than the first threshold value is held in the memory, and when the time difference between the time point at which the foreign object warning flag is turned ON and the time point at which the echo signal frequency is higher than the first threshold value is equal to or more than the predetermined time, the third step is executed.

* * * * *